United States Patent
Ishii et al.

(10) Patent No.: US 10,601,277 B2
(45) Date of Patent: Mar. 24, 2020

(54) INSULATED WIRE AND METHOD OF PRODUCING THE SAME, AND ROTATING ELECTRICAL MACHINE AND METHOD OF PRODUCING THE SAME

(71) Applicants: FURUKAWA ELECTRIC CO., LTD., Tokyo (JP); FURUKAWA MAGNET WIRE CO., LTD., Tokyo (JP)

(72) Inventors: Yohei Ishii, Tokyo (JP); Tsuneo Aoi, Tokyo (JP)

(73) Assignees: FURUKAWA ELECTRIC CO., LTD., Tokyo (JP); FURUKAWA MAGNET WIRE CO., LTD., Tokyo (JP)

( * ) Notice: Subject to any disclaimer, the term of this patent is extended or adjusted under 35 U.S.C. 154(b) by 721 days.

(21) Appl. No.: 15/216,093

(22) Filed: Jul. 21, 2016

(65) Prior Publication Data

US 2016/0329770 A1    Nov. 10, 2016

Related U.S. Application Data

(63) Continuation of application No. PCT/JP2015/050540, filed on Jan. 9, 2015.

(30) Foreign Application Priority Data

Jan. 22, 2014    (JP) .................................. 2014-009913

(51) Int. Cl.
*H02K 3/40* (2006.01)
*H02K 15/04* (2006.01)
(Continued)

(52) U.S. Cl.
CPC ................ *H02K 3/40* (2013.01); *H01B 3/30* (2013.01); *H01B 3/305* (2013.01); *H01B 3/306* (2013.01);
(Continued)

(58) Field of Classification Search
CPC . H02K 3/40; H01B 3/30; H01B 3/305; H01B 3/306; H01B 3/307; H01B 3/308; H01B 7/0275; H01B 13/14
(Continued)

(56) References Cited

U.S. PATENT DOCUMENTS 4,379,858 A      4/1983 Suzuki
6,951,985 B1 *  10/2005 Lemelson ............... H01L 39/14
                                                                174/125.1
(Continued)

FOREIGN PATENT DOCUMENTS

CA      2893045 A1 *  8/2014  ............. H01B 3/308
CN   101291086 A      10/2008
(Continued)

OTHER PUBLICATIONS

Felten (DE 2458754 A)English Translation (Year: 1976).*
(Continued)

*Primary Examiner* — Quyen P Leung
*Assistant Examiner* — Robert E Mates
(74) *Attorney, Agent, or Firm* — Birch, Stewart, Kolasch & Birch, LLP (57) ABSTRACT

An insulated wire in which at least one layer of an insulating material is coated around a conductor, wherein the insulated wire has a part in which relative permittivity is different in a length direction or a circumferential direction in an identical coating layer and a method of producing the same, and a rotating electrical machine and a method of producing the same.

4 Claims, 5 Drawing Sheets (51) Int. Cl.
  *H01B 3/30* (2006.01)
  *H01B 13/14* (2006.01)
  *H01B 7/02* (2006.01)
(52) U.S. Cl.
  CPC ............. *H01B 3/307* (2013.01); *H01B 3/308* (2013.01); *H01B 7/0275* (2013.01); *H01B 13/14* (2013.01); *H02K 15/0421* (2013.01)
(58) Field of Classification Search
  USPC .................. 310/196, 179, 184, 183, 195
  See application file for complete search history.

(56) References Cited

U.S. PATENT DOCUMENTS

| | | | |
|---|---|---|---|
| 2004/0145257 | A1 | 7/2004 | Oohashi |
| 2007/0169959 | A1* | 7/2007 | Ding ................ H01L 23/49827 174/260 |
| 2008/0231136 | A1 | 9/2008 | Obata |
| 2013/0014971 | A1 | 1/2013 | Muto et al. |
| 2015/0262732 | A1* | 9/2015 | Oya ....................... H01B 3/308 310/195 |

FOREIGN PATENT DOCUMENTS

| | | | | |
|---|---|---|---|---|
| DE | 2458754 | A | * | 6/1976 |
| DE | 2458754 | A1 | | 6/1976 |
| EP | 2568476 | A1 | | 3/2013 |
| GB | 1283271 | A | | 7/1972 |
| JP | 59226641 | A | * | 12/1984 ............... H02K 3/40 |
| JP | 2008-236924 | A | | 10/2008 |
| JP | 2009278806 | A | * | 11/2009 |
| JP | 2010035253 | A | * | 2/2010 |
| TW | 297798 | B | | 2/1997 |
| WO | WO 2011/118717 | A1 | | 9/2011 |

OTHER PUBLICATIONS

Kimura (JP 59226641 A) English Translation (Year: 1984).*
Takizawa (JP 2010035253 A) English Translation (Year: 2010).*
Wakimoto (JP 2009278806 A) English Translation (Year: 2009).*
International Search Report, issued in PCT/JP2015/050540, dated Apr. 14, 2015.
Written Opinion of the International Searching Authority, issued in PCT/JP2015/050540, dated Apr. 14, 2015.
Partial Supplementary European Search Report for European Application No. 15740870.9, dated Aug. 2, 2017.
Extended European Search Report for European Application No. 15740870.9, dated Nov. 7, 2017.
Taiwanese Office Action and Search Report dated Sep. 26, 2019 in Taiwanese Patent Application No. 10820914760, with English translation.

* cited by examiner

INSULATED WIRE AND METHOD OF PRODUCING THE SAME, AND ROTATING ELECTRICAL MACHINE AND METHOD OF PRODUCING THE SAME

CROSS-REFERENCE TO RELATED APPLICATIONS

This application is a Continuation of PCT International Application No. PCT/JP2015/050540 filed on Jan. 9, 2015, which claims priority under 35 U.S.C. § 119 (a) to Japanese Patent Application No. 2014-009913 filed in Japan on Jan. 22, 2014. Each of the above applications is hereby expressly incorporated by reference, in its entirety, into the present application.

TECHNICAL FIELD

The present invention relates to an insulated wire and a method of producing the same, and a rotating electrical machine and a method of producing the same.

BACKGROUND ART

In a rotating electrical machine, such as an automobile and a motor for general industries, a demand has grown for high output and size reduction with high density. With regard to the size reduction, insulated wires are made into the cross-section rectangular form, in order to improve conductor occupancy in a slot of a stator core of the rotating electrical machine. In recent years, in the rotating electrical machine, the insulated wire is cut and turn-processed into U-shape or the like, and two ends (open end portions) of the U-shape or the like of a plurality of the insulated wires having U-shape or the like are alternately connected into a coil, and set in the slots of the stator core. This coil (insulated wire divided segments) of the thus connected insulated wire having U shape or the like is constituted of: a slot housing portion (slot straight-line portion) to be housed in the slot; and a coil end portion that is not housed in the slot (a turn portion having U shape or the like, and open end portions being two ends). Two linear slot housing portions of the coil of the insulated wire having U-shape or the like are set in different slots, respectively. On the other hand, curved coil end portions having U-shape or the like, and coil end portions in the open end portions are aligned in a state in which both are not housed in the slots, and protruded therefrom in parts above and below the slots, and the coil end portions in the open end portions and other coil open end portions are connected and wired. Thus, achievement of higher density is attempted, by further shortening the coil end portions.

On the other hand, high output is achieved, by achievement of high voltage, high current, and high rotation in the rotating electrical machine.

Herein, the coil is formed by bundling a plurality of insulation-covered conductors vertically, horizontally, or vertically and horizontally, and when necessary, the plurality of these bundled insulated wires are wholly covered with resin for electric field relaxation or achievement of insulation.

However, at a conventional high voltage exceeding a specified voltage at several of kHz to several tens of kHz, insulation performance has been insufficient by the coil or the insulated wire to be used in the rotating electrical machine. In particular, durability in a long-term use is required.

With regard to this durability, corona discharge is generated among coated conductors (among a plurality of bundled coated conductors) at predetermined electric field intensity or more, and the durability is adversely affected. It is strongly required to suppress this corona discharge, namely partial discharge deterioration to minimum.

In general, the partial discharge deterioration is a phenomenon in which an insulating material complexly receives molecular chain scission deterioration by collision of charged particles generated by partial discharge thereof, sputtering deterioration, thermal fusion or thermal decomposition deterioration by a local temperature rise, chemical deterioration by ozone generated by electric discharge, and the like. Thus, thickness is reduced, in several cases, in the insulating material that is deteriorated by actual partial discharge.

This partial discharge deterioration is apt to cause at the curved coil end portion having U-shape or the like, which is neither housed nor fixed in the slot. For example, proposals have been made on varying: a thickness of an insulation coating with which a conductor is coated; and an insulating material with which the conductor is coated, in the above-described slot housing portions and the coil end portions of the coils of insulated wires (see Patent Literature 1).

CITATION LIST

Patent Literature

Patent Literature 1: JP-A-2008-236924 ("JP-A" means unexamined published Japanese patent application)

SUMMARY OF INVENTION

Technical Problem

However, in order to produce such insulated wires, a complicated producing process is required, and such an art also has had a problem in terms of production cost.

Accordingly, the present invention is contemplated for solving the above-described problems as the first task.

That is, the present invention is contemplated for providing: an insulated wire, which is excellent in durability to partial discharge deterioration and which can be produced by a simple and inexpensive producing process without requiring a complicated producing process; and a producing method therefor; and a rotating electrical machine and a producing method therefor.

Solution to Problem

The inventors of the present invention conducted various studies to solve the above-described problems. In particular, the inventors conducted studies centering neither on a thickness of a part serving as a coil end portion of an insulated wire and a part serving as a slot housing portion thereof nor on varying an insulating material, but on a means for suppressing corona discharge in the coil end portion by using an identical insulating material. As a result, the inventors found that partial variation of relative permittivity in a length direction of the insulated wire is effective, that no complicated producing process is required, and that durability of the insulated wire can be improved. The present invention was completed based on these findings.

That is, the present invention it to provide the following means:

(1) An insulated wire in which at least one layer of an insulating material is coated around a conductor, wherein the insulated wire has a part in which relative permittivity is different in a length direction or a circumferential direction in an identical coating layer.
(2) The insulated wire described in the item (1), wherein the insulating material is a resin, and relative permittivity in the part in which the relative permittivity is different is lower than relative permittivity of a material of the resin.
(3) The insulated wire described in the item (1) or (2), wherein relative permittivity of the coating layer is different, by a difference in bulk density of the coating layer.
(4) The insulated wire described in any one of the items (1) to (3), wherein the relative permittivity is different, by containing bubbles in the coating layer.
(5) The insulated wire described in any one of the items (1) to (4), wherein the part, in which the relative permittivity is different in the length direction or the circumferential direction in the identical coating layer, comprises being foamed.
(6) The insulated wire described in any one of the items (1) to (5), wherein an insulating material that constitutes a covering layer having the part in which the relative permittivity is different, contains at least a resin selected from the group of: polyphenylene sulfide, polycarbonate, polyethylene terephthalate, polybutylene terephthalate, polyethylene naphthalate, polyether ether ketone, polyethersulfone, polyetherimide, polyimide, and polyamideimide.
(7) The insulated wire described in any one of the items (1) to (6), wherein a cross-sectional shape of the conductor is circular or rectangular.
(8) A rotating electrical machine, comprising the insulated wire described in any one of the items (1) to (7).
(9) The rotating electrical machine described in the item (8), wherein the insulated wire is processed by winding into a coil, and the coil comprises: a slot housing portion to be housed in a slot of a stator core in which the coil is set; and a coil end portion that is not housed in the slot of the stator core.
(10) The rotating electrical machine described in the item (9), wherein relative permittivity of an insulted wire coating in the coil end portion that is not housed in the slot of the stator core, is lower than relative permittivity of an insulated wire coating in the slot housing portion that is housed in the slot of the stator core.
(11) A method of producing an insulated wire in which at least one layer of an insulating material is coated around a conductor,
wherein the insulated wire is an insulated wire having a part in which relative permittivity is different, in a length direction or a circumferential direction in an identical coating layer, and
wherein the part in which the relative permittivity is different, is formed, by foaming the insulating material.
(12) The method of producing the insulated wire described in the item (11), wherein an insulated wire in which an insulating material is not foamed, with the insulated wire being coated with the insulating material, is produced, and then the insulating material is foamed.
(13) The method of producing the insulated wire described in the item (11) or (12), in which the foaming is performed by the insulating material being penetrated with a gas or liquid, and then foaming the resultant insulating material, wherein the insulating material is covered with a material that is solid and that causes no deformation even at a heating temperature in foaming, and wherein a part not covered therewith has lower relative permittivity in comparison with a part covered therewith.
(14) A method of producing a rotating electrical machine, using an insulated wire in which at least one layer of an insulating material is coated around a conductor, wherein the insulated wire is processed into a coil, and the coil comprises: a slot housing portion that is housed in a slot of a stator core in which the coil is set; and a coil end portion that is not housed in the slot of the stator core, and
wherein relative permittivity of an insulating material in the coil end portion is lowered either in a step of setting the coil in the slot of the stator core to fix the coil or in a step of assembling the rotating electrical machine thereafter.
(15) The method of producing the rotating electrical machine described in the item (14), wherein the insulating material in the coil end portion that is not housed in the slot of the stator core is foamed.

Advantageous Effects of Invention

The present invention can provide an insulated wire that is excellent in durability to partial discharge deterioration, and that can be produced by a simple and inexpensive producing process without requiring a complicated producing process; and a producing method therefor; and a rotating electrical machine and a producing method therefor.

Other and further features and advantages of the invention will appear more fully from the following description, appropriately referring to the accompanying drawings.

BRIEF DESCRIPTION OF DRAWINGS

FIG. 7(a1), FIG. 7(a2), and FIG. 7(a3) each are a schematic top view of an insulated wire in which a circular conductor is used; FIG. 7(b1), FIG. 7(b2), and FIG. 7(b3) each are a cross-sectional view; FIG. 7(c2) is a $z_1z_2$ cross-sectional view; and FIG. 7(c3) is a $z_3z_4$ cross-sectional view. Each is a schematic process diagram for forming a non-foamed portion by partial masking in a length direction.

FIG. 8(a1), FIG. 8(a2), and FIG. 8(a3) each are a schematic top view of an insulated wire in which a rectangular conductor is used; FIG. 8(b1), FIG. 8(b2), and FIG. 8(b3) each are a cross-sectional view; FIG. 8(c2) is a $z_1z_2$ cross-sectional view; and FIG. 8(c3) is a $z_3z_4$ cross-sectional view. Each is a schematic process diagram for forming a non-foamed portion by partial masking in a length direction.

MODE FOR CARRYING OUT THE INVENTION

<<Insulated Wire>>

An insulated wire of the present invention can be preferably used in a rotating electrical machine, for example, for a motor for general industries and an automobile.

In the present invention, partial discharge deterioration of the insulated wire, particularly in a part in which corona discharge is apt to generate, is suppressed, to improve durability, by providing a part in which relative permittivity of an insulating material with which a conductor is covered is different, in a length direction or a circumferential direction of the insulated wire.

Figure 5:
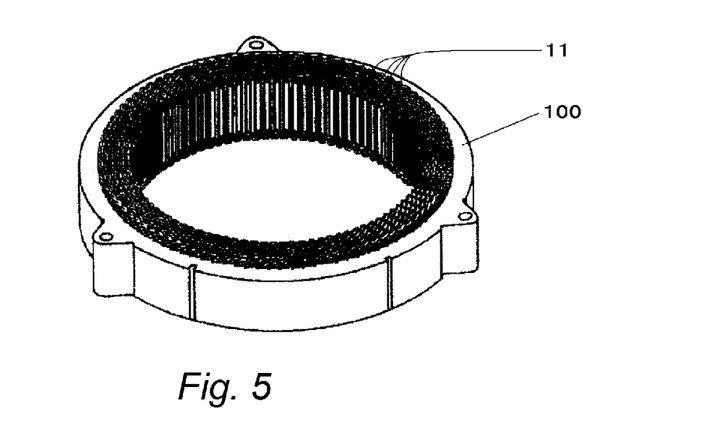
FIG. 5 is an overall perspective view of a stator.

For example, in the case of the rotating electrical machine, such as the automobile, as shown in FIG. 5, a processed insulated wire (coil) 11 is assembled into a stator 100.

Figures 2A, 2B:
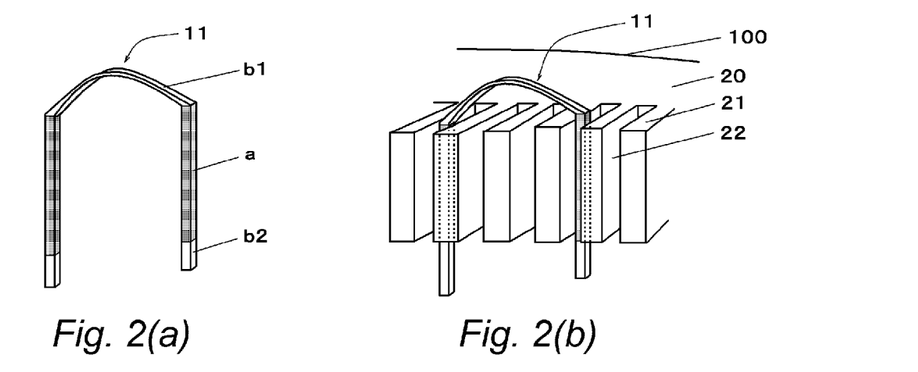
FIG. 2(a) is a schematic appearance perspective view showing a shape of a coil (insulated wire divided segments) to be used in the present invention.
FIG. 2(b) is an enlarged perspective view schematically showing a state in which the coil is fitted to a slot of a stator core.
Figures 3A, 3B:
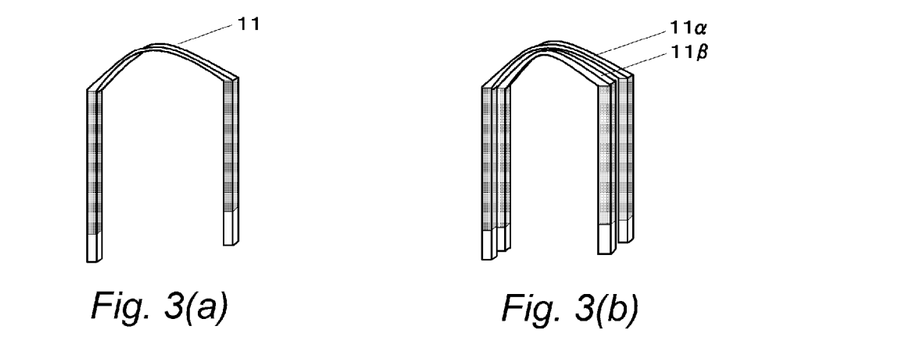
FIG. 3(a) is a schematic appearance perspective view showing a shape of a coil to be used in the present invention.
FIG. 3(b) is a schematic appearance perspective view in which 2 sets of coils are set.
Figure 4:
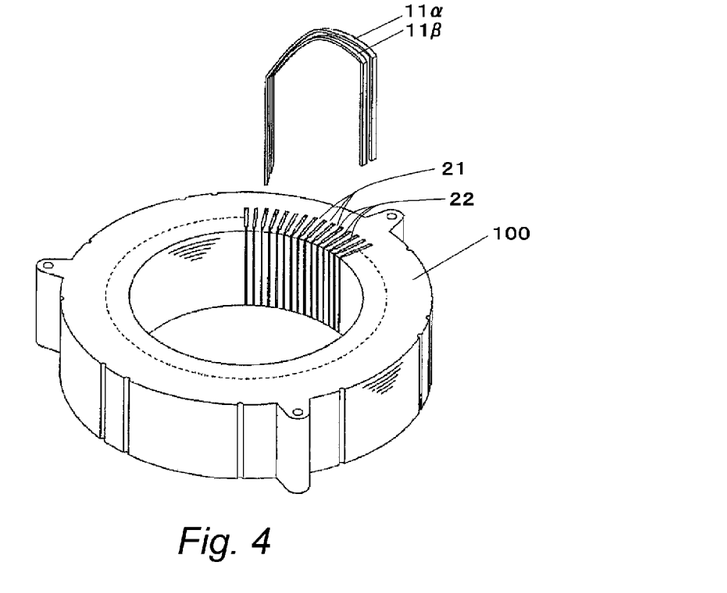
FIG. 4 is a perspective view showing a step of inserting coils in which 2 sets are set into slots of a stator core, according to the present invention.

In this stator 100, the coil (insulated wire divided segments) 11 as shown in FIG. 2(*a*) or FIG. 3(*a*) is applied as a minimum basic unit, and ordinarily, a set of 2 sets (11α, 11β) is applied as a basic unit, as shown in FIG. 3(*b*), and housed in a slot 22 in a manner shown in FIG. 4. Herein, FIG. 2(*b*) schematically shows a state in which the coil (insulated wire divided segments) 11 being the minimum basic unit is housed therein. The coil (insulated wire divided segments) 11 is assembled into a tees 21, and a slot 22 different from the slot 22 as provided in the stator core 20 of the stator 100. On this occasion, as shown in FIG. 2(*a*), the coil (insulated wire divided segments) 11 is constituted of a slot housing portion a (11*a*) to be housed in the slot 22, and a coil end portion that is not housed therein, in detail, a turn portion b1 (11*b*1) having U-shape or the like, and open end portions b2 (11*b*2) being two end portions. In addition, the slot housing portion a (11*a*) is ordinarily linear.

Figure 6A:
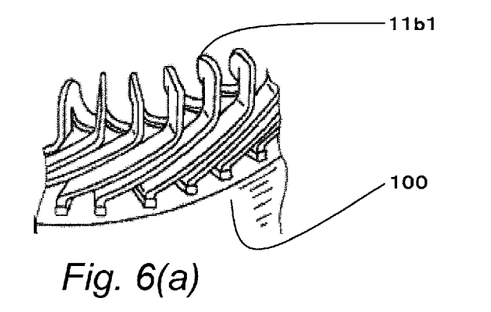
FIG. 6(a) is a schematic partial perspective view of a stator.

As shown in FIG. 4, the coil (insulated wire divided segments) 11 is applied as the minimum basic unit, and ordinarily a set of 2 sets (11α, 11β) is applied as the basic unit, as shown in FIG. 3(*b*), and is assembled into the stator. Then, the coil (insulated wire divided segments) b1 (11*b*1) and the coil (insulated wire divided segments) b2 (11*b*2) are protruded from the slot 22, and the coil (insulated wire divided segments) b1 (11*b*1) is aligned in a state as shown in FIG. 6(*a*). On the other hand, the coil (insulated wire divided segments) b2 (11*b*2) is processed by bending, and two coil end portions in the open end portions are connected to other coil open end portions, and wired.

Figure 6B:
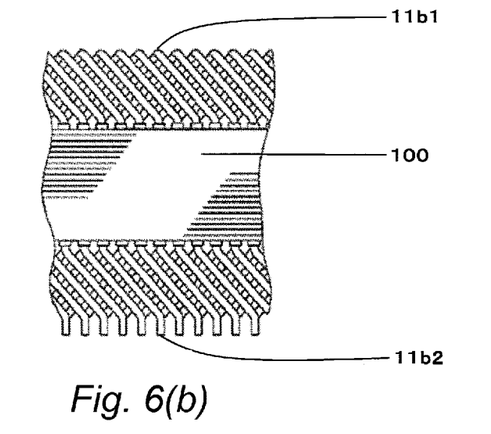
FIG. 6(b) is a schematic side view of the stator.

FIG. 6(*b*) is a side view of the stator 100 shown in FIG. 5, into which the insulated wire (coil) 11 is assembled, and the coil end portions (11*b*1, 11*b*2) of the insulated wire (coil) 11 are protruded above and below the stator 100.

In the insulated wire in the stator 100, the corona discharge is apt to generate in the slot end portions (11*b*1, 11*b*2).

Thus, the partial discharge deterioration in the coil end portion (particularly, the turn portion 11*b*1 having U-shape or the like) in which the corona discharge is most apt to generate is suppressed, to improve the durability, by adjusting relative permittivity of the coil end portions (11*b*1, 11*b*2) and relative permittivity of the slot housing portion (11*a*) to different values, and preferably by adjusting the relative permittivity of the coil end portions (11*b*1, 11*b*2) to be lower than the relative permittivity of the slot housing portion (11*a*).

The insulated wire of the present invention is the insulated wire in which at least one layer of the insulating material is coated around the conductor.

Herein, in this specification, the coating is used in the same meaning with the covering, and the coating layer is used in the same meaning with the covering layer.

Hereinafter, the components are described from a conductor.

<Conductor>

As for the conductor to be used in the present invention, a material thereof is not limited, as long as it has electrical conductivity. Examples thereof include copper, a copper alloy, aluminum, an aluminum alloy, and the like. However, the present invention is not limited to these materials. In the case where the conductor is copper, for example, when copper is melted by heat for welding, from the viewpoint of preventing occurrence of void at the welded portion due to contained oxygen, preferably the copper has its content of 99.96% or more and the copper is preferably a low-oxygen copper having an oxygen content of preferably 30 ppm or less, more preferably 20 ppm or less, or an oxygen-free copper. In the case where the conductor is aluminum, from the viewpoint of a required mechanical strength, various aluminum alloys can be used. For example, for such a use as a rotating electrical machine, it is preferred to use a 99.00% or more-grade pure aluminum by which a high current value can be obtained.

A cross-sectional shape of the conductor is determined according to an application, and thus any shapes, such as a circular shape (round), a rectangular shape (rectangular) or a hexagonal shape, may be utilized. For example, for the application, such as the rotating electrical machine, a rectangular conductor is preferable in view of a capability of keeping high conductor occupancy in the slot of the stator core.

A size of the conductor is determined according to the application, and is not particularly designated. In the case of a round conductor, the size is preferably 0.3 to 3.0 mm, and more preferably 0.4 to 2.7 mm in terms of a diameter. In the case of a rectangular conductor, a width (long side) as a length of one side is preferably 1.0 to 5.0 mm, and more preferably 1.4 to 4.0 mm, and a thickness (short side) is preferably 0.4 to 3.0 mm, and more preferably 0.5 to 2.5 mm. However, a range of the conductor size in which advantageous effects of the present invention are obtained is not limited thereto. Moreover, in the case of the rectangular conductor, although the shape is also different according to the application, a cross-sectional rectangular (quadrate) is more general than a cross-sectional square. Moreover, in the case of the rectangular conductor, when the application is the rotating electrical machine, for chamfering (curvature radius r) in four corners in a conductor cross section, r is preferably smaller from a viewpoint of keeping the high conductor occupancy in the slot of the stator core. From a viewpoint of suppressing a phenomenon of partial discharge by concentration of an electric field on the four corners, r is preferably larger. Thus, the curvature radius r is preferably 0.6 mm or less, and more preferably 0.2 to 0.4 mm. However, the range in which the advantageous effects of the present invention are obtained is not limited thereto.

<Coating Layer>

Figures 1A, 1B:
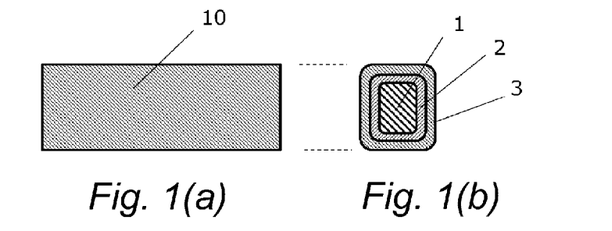
FIG. 1(a) is a schematic top view of an insulated wire.
FIG. 1(b) is a schematic cross-sectional view of the insulated wire.

In the present invention, the insulated wire has at least one layer of the coating layer composed of the insulating material. For example, FIG. 1 shows an insulated wire in which a rectangular conductor 1 is covered with two layers of coating layers (a first coating layer 2 and a second coating layer 3). Herein, FIG. 1(*a*) is a top view of an insulated wire 10, and FIG. 1(*b*) is a cross-sectional view thereof.

As the insulating material, a resin is preferable, and examples of the resin that can be used for an insulation covering resin in the present invention include: a thermoplastic resin, such as general-purpose engineering plastics, including polyamide (PA) (nylon), polyacetal (POM), polycarbonate (PC), polyphenylene ether (including modified polyphenylene ether), polybutylene terephthalate (PBT), polyethylene terephthalate (PET), polyethylene naphthalate (PBN), polyethylene naphthalate (PEN), and ultra-high molecular weight polyethylene; and also super engineering plastics, including polysulfone (PSF) or polysulfone (PSU), polyethersulfone (PES), polyphenylsulfone (PPSU), polyetherimide (PEI), polyphenylene sulfide (PPS), polyarylate (U polymer), polyetherketone (PEK), polyaryletherketone (PAEK) (including modified PEEK), tetrafluoroethylene/ethylene copolymers (ETFE), polyether ether ketone (PEEK), tetrafluoroethylene/perfluoroalkyl vinyl ether copolymers (PFA) (FEP), polytetrafluoroethylene (PTFE), thermoplastic polyimide (TPI), polyamideimide (PAI), and liquid crystal polyester; and further polymer alloys, containing as a base resin polyethylene terephthalate (PET) or polyethylene naphthalate (PEN); and polymer alloys containing the above-described engineering plastics, including acrylonitrile/butadiene/styrene copolymers (ABS) with polycarbonate, nylon 6, 6 with aromatic polyamide resins, polyphenylene ether/nylon 6, 6, polyphenylene ether/polystyrene, and polybutylene terephthalate/polycarbonate. One kind of these thermoplastic resins may be used alone, or two or more kinds may be combined and used.

In addition, a resin of use is not limited by names of the resins indicated above, and in addition to the resins listed above, any resin obviously can be used if the resin is superior to those resins in terms of performance.

The coating layer of the thermoplastic resin may be provided by forming a resin varnish to apply the resultant varnish to the conductor, or further applying baking after application, in the same manner as a coating layer of a thermosetting resin as mentioned later. An extrusion-covering resin layer is preferably provided by extruding the thermoplastic resin.

Examples of the resin that can be used in the insulation covering resin in the present invention include: a thermosetting resin, such as polyimide, polyurethane, polyamideimide, polyester, polybenzimidazole, polyesterimide, a melamine resin, and an epoxy resin. Moreover, two or more kinds of these resins may be combined and used.

Moreover, in addition to the resins listed above, any resin obviously can be used if the resin is superior to those resins in terms of performance.

The coating layer of the thermosetting resin can be formed by a method similar to the method of baking of an enameled wire.

That is, the coating layer of the thermosetting resin can be provided, by forming a varnish of the thermosetting resin with an organic solvent into a resin varnish, applying this resin varnish to the conductor, and baking the conductor on which the varnish is applied in a baking furnace by a conventional method. Although specific baking conditions are influenced by a shape of the furnace to be used and the like, if a natural convection-type vertical furnace of about 5 m is applied to, baking can be achieved by setting a passing time to 10 to 90 seconds at 400 to 500° C.

The organic solvent to be used for forming the varnish of the resin varnish is not particularly restricted, as long as the solvent does not adversely affect a reaction of the thermosetting resin. Specific examples thereof include: an amide-based solvent, such as N-methyl-2-pyrrolidone (NMP), N,N-dimethylacetamide (DMAC), dimethyl sulfoxide, and N,N-dimethylformamide; a urea-based solvent, such as N,N-dimethylethyleneurea, N,N-dimethylpropyleneurea, and tetramethylurea; a lactone-based solvent, such as γ-butyrolactone and γ-caprolactone; a carbonate-based solvent, such as propylene carbonate; a ketone-based solvent, such as methyl ethyl ketone, methyl isobutyl ketone, and cyclohexanone; an ester-based solvent, such as ethyl acetate, n-butyl acetate, butyl cellosolve acetate, butyl carbitol acetate, ethyl cellosolve acetate, and ethyl carbitol acetate; a glyme-based solvent, such as diglyme, triglyme, and tetraglyme; a hydrocarbon-based solvent, such as toluene, xylene, and cyclohexane; and a sulfone-based solvent, such as sulfolane. A boiling point of the organic solvent is preferably 160° C. to 250° C., and more preferably 165° C. to 210° C.

Among these organic solvents, an amide-based solvent or a urea-based solvent is preferable in view of high solubility, high reaction acceleration performance and the like, and because the organic solvent does not have any hydrogen atom that is apt to inhibit a crosslinking reaction by heat, N-methyl-2-pyrrolidone, N,N-dimethylacetamide, N,N-dimethylethyleneurea, N,N-dimethylpropyleneurea or tetramethylurea is more preferable, and N-methyl-2-pyrrolidone is particularly preferable.

In addition, the resin varnish may contain, in addition to the resin, when necessary, any of various additives, such as an antioxidant, an antistatic agent, a ultraviolet radiation inhibitor, a light stabilizer, a fluorescent whitening agent, a pigment, a dye, a compatibilizer, a lubricant, a reinforcing agent, a flame retardant, a crosslinking agent, a crosslinking coagent, a plasticizer, a thickening agent, a viscosity reducer, and an elastomer.

In the present invention, the resin varnish preferably contains at least a resin selected from polyphenylene sulfide (PPS), polycarbonate (PC), polyethylene terephthalate (PET), polybutylene terephthalate (PBT), polyethylene naphthalate (PEN), polyether ether ketone (PEEK), polyethersulfone (PES), polyetherimide (PEI), polyimide (PI), and polyamideimide (PAI).

Specific examples of a commercially available product of polyphenylene sulfide (PPS) include: FZ-2100 (trade name, manufactured by DIC Corporation); specific examples of a commercially available product of polycarbonate (PC) include: Panlite LV-2250Y (trade name, manufactured by Teijin Limited); specific examples of a commercially available product of polyethylene terephthalate (PET) include: TR-8550T (trade name, manufactured by Teijin Limited); specific examples of a commercially available product of polybutylene terephthalate (PBT) include: Toraycon 1401X31 (trade name, manufactured by Toray Industries, Inc.); specific examples of a commercially available product of polyethylene naphthalate (PEN) include: Teonex TN8065S (trade name, manufactured by Teijin Limited); specific examples of a commercially available product of polyether ether ketone (PEEK) include: KetaSpire KT-820 (trade name, manufactured by Solvay Specialty Polymers Japan K.K.), and PEEK 450G (trade name, manufactured by Victrex Japan Co. Ltd.); specific examples of a commercially available product of polyethersulfone (PES) include: Sumikaexcel PES (trade name, manufactured by Sumitomo Chemical Co., Ltd.); specific examples of a commercially available product of polyetherimide (PEI) include: ULTEM 1010 (trade name, manufactured by Sabic Innovative Plastics Holding BV); specific examples of a commercially available product of polyimide (PI) include: AURUM PL450C (trade name, manufactured by Mitsui Chemicals, Inc.); and specific examples of a commercially available product of polyamideimide (PAI) include: HI406 (trade name, manufactured by Hitachi Chemical Company, Ltd.).

A total thickness of the coating layer is preferably 3 to 200 μm, more preferably 10 to 80 μm, and further preferably 20 to 50 μm.

In the present invention, the insulated wire may have two or more layers of the coating layers. In addition, a case where the completely same resin varnish is applied a plurality of times, and baking the resultant material to merely adjust a thickness of the layer is counted as one layer, namely regarded to be identical, and a case where a kind or an amount of additive(s) in the resin varnish is different even in the same resin is counted as another layer.

In the insulated wire of the present invention, as indicated in JP-B-4177295, as a configuration of an insulation coating, the insulation coating is used in which the thermosetting resin capable of maintaining high adhesion with the conductor or high heat resistance of the coating is disposed on a periphery of the conductor, and the thermoplastic resin capable of easily incorporating bubbles thereinto to obtain a high foaming ratio is disposed on an outer periphery thereof. Thus, all of securement of adhesion between the conductor and the insulation coating, heat resistance of the insulation coating, and a difference in the relative permittivity of the insulation coating can be satisfied.

<<Insulated Wire having a Part in which Relative Permittivity is Different in Length Direction or Circumferential Direction in Identical Coating Layer, and Producing Method Therefor>>

The insulated wire of the present invention has the part in which the relative permittivity is different in the length direction or the circumferential direction in the identical coating layer.

When the insulated wire has a plurality of coating layers, the layer having the part in which the relative permittivity is different in an identical layer is allowed to be any layer.

For example, a layer in contact with the conductor, an outermost layer, or an internal layer is allowed. Moreover, it is also preferable that the relative permittivity in all layers in an identical place is different.

In the present invention, the insulated wire having two or more layers of the coating layers on the conductor is preferable. In this case, the layer in which the relative permittivity is different in the identical layer is preferably a layer upper than the layer in contact with the conductor. Moreover, it is also preferable that the relative permittivity in the identical place in all layers in the layers upper than the layer in contact with the conductor, is different from the relative permittivity in another place.

With regard to a change in the relative permittivity, the relative permittivity in a desired part is preferably varied by using an identical resin, without varying the insulating material with which the layer having the part in which the relative permittivity is different is formed, preferably without varying a kind of resin.

In the present invention, the relative permittivity is preferably varied by varying bulk density of the resin, preferably existence or absence of the bubbles, or an amount of total volume of the bubbles per unit volume.

Moreover, in the present invention, the bubbles are preferably formed by foaming the resin.

Specific examples of a method in which the bubbles are formed in the resin by foaming only a specific place in the length direction or the circumferential direction of the insulated wire include: a method in which a gas or liquid is penetrated into an insulated wire to foam the penetrated gas or liquid; and a method in which a trace amount of a foaming nucleating agent is incorporated into a resin varnish upon producing an insulated wire, and under conditions in which no foaming nucleating agent is vaporized, the insulated wire is produced, and in processing the wire into a required shape, only a place in which relative permittivity is planned to be lowered is heated, to foam the resin varnish.

In the present invention, it is preferable to use a method in which a gas or liquid is penetrated into an insulated wire, to foam the penetrated gas or liquid.

One preferable aspect of the present invention is the method: in which the gas is penetrated into the insulation coating of the insulated wire after the insulated wire is produced, to foam the insulation coating with the penetrated gas as a starting point.

The insulation coating in this case is preferably the extrusion covering resin layer composed of the thermoplastic resin.

(Foaming by a Gas)

A gas to be used is preferably an inert gas, and specific examples thereof include: argon, hydrogen, methane, chlorofluorohydrocarbon (Freon), carbon dioxide gas, helium, oxygen, and nitrogen. Among these, carbon dioxide gas is preferable, in which gas penetrating force into the resin to be used in the usual insulated wire is high, and in which the resin can be foamed at a high foaming ratio.

In addition, the gas to be used may be reduced to a liquid state under a high pressure, and may be in this liquid state, and these are collectively referred to as the inert gas herein. In a similar manner, "in the inert gas atmosphere" includes "in the liquid of the inert gas."

With regard to foaming the resin by the inert gas, the resin is preferably foamed according to the order of steps (1) to (2) as described below.

Foaming Method (1) A step of holding the insulated wire in a pressurized inert gas atmosphere, to penetrate the inert gas thereinto;

(2) A step of heating the insulated wire in which the inert gas is penetrated into the resin under a normal pressure, to foam the resin.

With regard to pressurization by a high-pressure gas in the step (1), although a level depends on the resin for using in the insulated wire, 1 to 20 MPa is preferable, 1 to 15 MPa is more preferable, and 1 to 10 MPa is further preferable. Moreover, a holding time in the inert gas atmosphere is preferably 6 hours or more, more preferably 12 hours or more, and further preferably 24 hours or more. A temperature under the inert gas atmosphere is preferably 40° C. or lower, more preferably 30° C. or lower, and further preferably 20° C. or lower.

With regard to a heating temperature for foaming the resin by heating the resin under the normal pressure in the step (2), although a level depends on the resin to be used in the coating layer, preferably in the extrusion-covering resin layer, if the temperature is higher than a glass transition temperature, the resin is apt to be deformed, and thus such a case is preferable. The heating temperature is higher preferably by 5 to 200° C., more preferably by 30 to 180° C., and further preferably by 50 to 150° C., than the glass transition temperature of the resin. A heating time, although a level depends on the heating temperature, is preferably 3 to 120 seconds.

In the present invention, any method is allowed, as long as the part in which the relative permittivity is low can be partially formed in the coating layer, preferably in the extrusion-covering resin layer. In addition to the gas penetration, such a method can be selected as: a method in which a component that is decomposed by ultraviolet radiation is added to a coating layer, preferably to an extrusion-covering resin layer, and the layer is partially irradiated with ultraviolet radiation after molding the coating to form bubbles by a decomposition gas; a method in which water is absorbed into a layer, and then the layer is heated to form bubbles by generation of a water vapor; and a method in which a component that is decomposed by irradiation with an electron beam is added to a layer, and the layer is partially irradiated with an electron beam after molding the coating to form bubbles by a decomposition gas.

The bubbles to be formed in the coating layer, preferably in the extrusion-covering resin layer, may be closed bubbles or open bubbles or both of these bubbles. Herein, the closed bubbles mean bubbles in which no holes, namely no communicating opening portions with adjacent bubbles can be confirmed on inner walls of the bubbles, when a cross section of the extrusion-covering resin layer cut at an arbitrary cross section is observed by means of a microscope; and the open bubbles mean bubbles in which the holes can be confirmed on the inner walls of the bubbles when the cross section is observed in a similar manner. With regard to the bubbles, the layer preferably includes the closed bubbles: in view of an increase in an internal pressure even on deformation by momentary collapse in a longitudinal direction, namely a thickness direction, while wear properties and mechanical properties of the coating layer, preferably the extrusion-covering resin layer are maintained, and when the pressure is released, easily returning to an original state; or in view of causing no infiltration of the solvent and the like into the bubbles even when the layer is dipped into the solvent and the like to cause no bury of a cellular part, and a capability of suppressing any rise of the relative permittivity.

A diameter of the bubble is expressed using a value obtained by observing a cross section of the coating layer, preferably the extrusion-covering resin layer by means of a scanning electron microscope (SEM), measuring diameters of 20 pieces of arbitrarily selected bubbles by a diameter measuring mode using image-analysis/measurement software (WinROOF, manufactured by p Mitani Corporation), and averaging the diameters, and calculating an average value. In addition, when a shape of the bubble is not circular, the longest part is taken as the diameter.

In addition, a size and the shape of the bubble obtained by foaming the resin are not particularly limited. The shape is preferably spherical. Averages of the diameter of one bubble is preferably 10 µm or less, more preferably 5 µm or less, and further preferably 2 µm or less, in terms of a radius in sphere equivalent of a bubble volume.

In the present invention, in order to provide the part in which the relative permittivity in the length direction of the insulated wire is different, the part in which the relative permittivity is relatively large is covered with a material that is solid and causes no deformation even at the heating temperature in a foaming step, so as to prevent the inert gas or the liquid from penetrating thereinto, or so as to adjust the temperature to be lower than the temperature in a part not covered therewith in foaming the resin.

Figure 7:
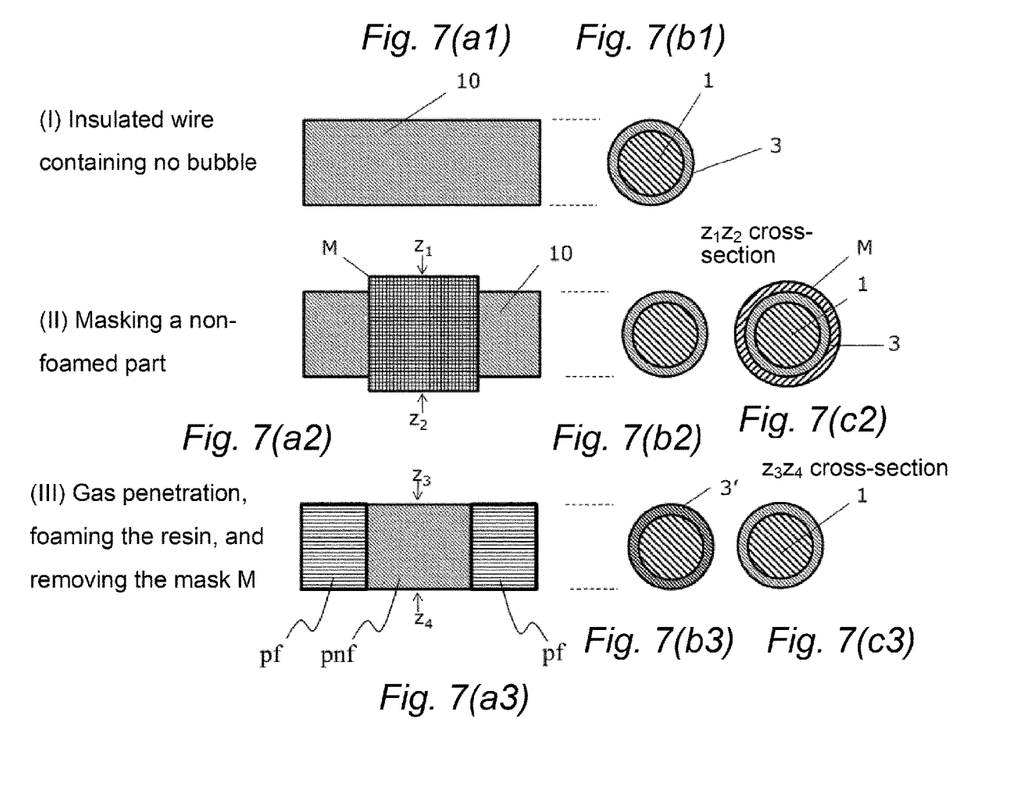

For example, steps in this method are shown in FIGS. 7($a$1) to 7($c$3) and 8($a$1) to 8($c$3).

Figure 8:
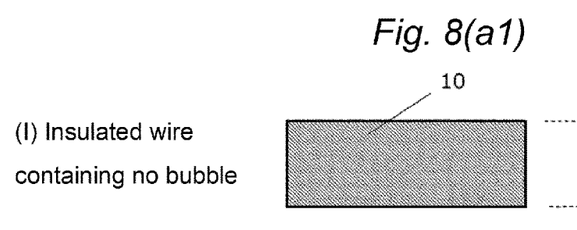

Herein, FIGS. 7($a$1) to 7($c$3) shows an insulated wire in which one layer of a coating layer is provided on a circular conductor 1, and as a preferable layer, an extrusion-covering resin layer 3 is coated thereon; and FIGS. 8($a$1) to 8($c$3) shows an insulated wire covered with two layers of coating layers 2 and 3 on a rectangular conductor 1. Moreover, both of FIGS. 7($a$1) to 7($c$3) and 8($a$1) to 8($c$3) show the following steps as preferable steps.

Step (I): step of providing, or producing and providing an insulated wire containing no bubble.

Step (II): step of masking a non-foamed part with a mask M.

Step (III): step of gas penetration, foaming the resin, and removing the mask M.

Herein, FIGS. 7($a$1) to 7($a$3) or 8($a$1) to 8($a$3) each are a top view in each step of an insulated wire 10, FIGS. 7($b$1) to 7($b$3) or 8($b$1) to 8($b$3) each are a cross-sectional view in each step, FIG. 7($c$2) or 8($c$2) is a cross-sectional view before being foamed in a $Z_1$-$Z_2$ part, FIG. 7($c$3) or 8($c$3) is a cross-sectional view in a non-foamed part (pnf) in a $Z_3$-$Z_4$ part in FIG. 7($a$3) or 8($a$3), and formation of foamed coating layers (pf in FIG. 7($a$3) and FIG. 8($a$3), and 3' in FIG. 7($b$3) and FIG. 8($b$3)) is shown in FIGS. 7($a$3) and 7($b$3) or 8($a$3) and 8($b$3).

As a masking material, for example, aluminum, stainless steel, iron, copper, glass, ceramics, or polyimide is preferable. Above all, when the insulated wire of the present invention is processed into the coil, and when only an insertion part is covered with the slot (for example, electromagnetic steel sheet) in the slot into which the coil is inserted, the coil can be held in the inert gas atmosphere in a state in which the coil of the processed insulated wire is inserted into and fixed in the slot, and such a case is preferable. For example, in the case of the rotating electrical machine, such as the motor, the stator in which the coil is fitted into the slot can be held in the inert gas atmosphere, and such a case is particularly preferable in the present invention. Moreover, when the coil is masked with aluminum, stainless steel, iron, copper, glass, or ceramics, neither the inert gas nor the liquid is penetrated thereinto, and thus the mask may be removed before the foaming step.

When the coil is covered with non-penetrating materials with a clearance, the resin is somewhat foamed even in a part covered therewith. If there is a difference in the relative permittivity in comparison with the part not covered therewith, the advantageous effects of the present invention are exhibited.

Accordingly, in the case of the rotating electrical machine, it is allowed to slightly make the clearance in the part covered with the slot to penetrate the gas or liquid thereinto and to foam the part. If at least the coil end portion is foamed, and the relative permittivity is lowered, the advantageous effects of the present invention are exhibited. In this case, the clearance between the slot and the insulated wire is rather buried by foaming of the slot housing portion, and another effect of the insulated wire being fixed is also obtained.

In the present invention, when the coating layer on the conductor includes only the thermosetting resin (enameled layer), the enameled layer can also be formed into the layer in which the relative permittivity is different by partially forming the bubbles in the length direction or the circumferential direction.

Specifically, as described in JP-A-2011-238384, as a method of forming the bubbles, the method is preferable in which a gas is penetrated into an insulated wire constituted by forming an insulation coating by baking a mixture in which a thermoplastic resin is mixed in an enamel paint thereon, to foam the resin with the penetrated gas.

As the thermosetting resin, any of various resins can be used within the range in which the spirit of the present invention is not adversely affected. For example, such a resin can be used as: polyimide, polyamideimide, polyesterimide, polyetherimide, polyimide hydantoin-modified polyester, polyamide, formal, polyurethane, polyester, polyvinylformal, epoxy, polyhydantoin, a melamine resin, a phenolic resin, a urea resin, and polybenzimidazole. Among these, such a resin as polyester, polyimide, polyamideimide, and polybenzimidazole is preferable in view of the heat resistance and flexibility. Moreover, one kind of these may be used alone, or two or more kinds may be combined and used.

As the thermoplastic resin that can be used in this application, if the resin is dissolved in the solvent, any resin may be applied thereto, and an amorphous thermoplastic resin is apt to dissolve therein and has good operability, and thus is preferable. In the present invention, the amorphous thermoplastic resin means, for example, an acrylic resin, a norbornene resin, a cycloolefin-based resin, polystyrene, polycarbonate, polyethersulfone, polyetherimide, polyphenyl sulfone, polysulfone, polyarylate, and thermoplastic polyimide. Among the amorphous thermoplastic resins, polyetherimide, polycarbonate, polyethersulfone, polyphenyl sulfone, polysulfone, polyarylate or the like is particularly preferable. The resin is made to apt to dissolve in the solvent by using the amorphous thermoplastic resin. Moreover, these resins can be finely dispersed into a network structure of the thermosetting resin, and fine pores can be formed. Moreover, one kind of these may be used alone, or two or more kinds may be combined and used.

Also when the thermoplastic resin is not dissolved in the solvent, the bubbles may be incorporated thereinto by using the insulated wire formed by applying a paint composed by dispersing a powder thermoplastic resin into the enamel paint and baking the resultant material. The powder may have any form, such as a spherical form or indefinite form within the range in which outer appearance of the coating is not adversely affected. A spherical form is more preferable in view of high electrical properties.

When a mass of a resin component without containing the solvent in the thermosetting resin is taken as A, and a mass of the thermoplastic resin is taken as B, a ratio A/B is preferably from 10/90 to 90/10, a ratio A/B is more preferably from 30/70 to 70/30, and a ratio A/B is particularly preferably from 40/60 to 60/40. If an amount of the component of the thermosetting resin is high, the insulated wire tends to be excellent in the heat resistance, but the foaming ratio is hard to increase, and an amount of lowering of the relative permittivity tends to be low. Moreover, if the amount of the component of the thermoplastic resin is high, the foaming ratio is easily increased, and the amount of lowering of the relative permittivity increases, but the insulated wire tends to be lowered in the heat resistance. Thus a mixing ratio according to need should be selected.

In addition, the layer of the thermoplastic resin may be provided on the coating layer composed of the thermosetting resin.

(Foaming by a Foaming Nucleating Agent)

Moreover, as another aspect of the present invention, there is a method, in which a foaming nucleating agent is incorporated into an insulation coating in a process of producing the insulated wire. Specifically, lowering of the relative permittivity can be realized, by foaming a predetermined place, by incorporating the foaming nucleating agent that is decomposed by ultraviolet radiation, an electron beam, heat or the like to generate a gas into an insulation coating resin, and then by applying ultraviolet radiation, an electron beam, heat or the like afterward only to a part in which lowering of the relative permittivity of the insulation coating is desired.

As to whether or not the resin of the insulated wire is foamed, for example, if any cellular bubbles can be confirmed, when a photograph of a cross section is observed, in the cross section cut in any of the thickness direction, a longitudinal direction or a crosswise direction in a sample area, by means of a scanning electron microscope or an optical microscope, foaming of the resin can be judged, or can be indirectly confirmed by lowering of the bulk density.

The bulk density of the resin in the foamed part is lowered. The foaming ratio is calculated from a relationship of this change in the bulk density.

Specifically, the foaming ratio can be determined by the following formula.

Foaming ratio=(Bulk density of a resin before being foamed)/(Bulk density of the resin after being foamed)

The foaming ratio is preferably 1.2 to 5.0, more preferably 1.2 to 2.0, and further preferably 1.3 to 1.8.

As this foaming ratio is larger, the relative permittivity in the foamed part is lowered.

(Measurement of a Bulk Density)

Herein, the bulk density for determining the foaming ratio can be measured as described below.

The bulk density is determined in accordance with Method A (water displacement method) in "Plastics-Methods of determining the density and relative density of non-cellular plastics" in JIS K 7112 (1999).

Specifically, for example, a density-measurement kit attached to Electronic Balance SX64 manufactured by Mettler Toledo International Inc. is used, and methanol is used as an immersion fluid. A U-shaped part being the coil end portion that is the foamed part of the extrusion-covering resin in the insulated wire, and the slot housing portion thereof that is not foamed are peeled off, respectively, and the resultant sample is taken as each test specimen, and the density of each test specimen is calculated from the following calculation formula.

Density of test specimen $\rho_{S,t}=(m_{S,A} \times \rho_{IL})/(m_{S,A}-m_{s,IL})$ Herein, $m_{S,A}$ is mass (g) of the test specimen measured in the air, $m_{s,IL}$ is mass (g) of the test specimen measured in the immersion fluid, and $\rho_{IL}$ is density (g/cm$^3$) of the immersion fluid.

(Measurement of Relative Permittivity)

On the other hand, the relative permittivity to be specified in the present invention can be determined, as described below, by measuring electrostatic capacity of an insulation layer; and calculating the relative permittivity from the thus-obtained electrostatic capacity.

Specifically, the relative permittivity is calculated from a relationship between a length of an electrode and a thickness of the insulation coating, by vapor-depositing a metal electrode on a whole circumference of a coating on an outermost surface of the insulated wire, and measuring the electrostatic capacity between the conductor and the metal electrode. Herein, the electrostatic capacity of the insulation layer is measured by using a commercially available LCR meter, for example, LCR HiTester (model 3532-50, manufactured by Hioki E.E. Corporation) at 25° C. and 100 Hz.

In the insulated wire in which the shape of the conductor is rectangular, partial relative permittivity can also be measured, if the insulation coating in a plane is locally peeled off, and the metal electrode is vapor-deposited on the plane in a certain one plane of flat planes (insulation coatings) of four planes in the circumferential direction.

The insulated wire of the present invention has the part in which the relative permittivity is different in the length direction or the circumferential direction in the identical coating layer. When the relative permittivity in the part in which the relative permittivity is high is taken as 100, the relative permittivity in the part in which the relative permittivity is low is preferably 90 or less, more preferably 80 or less, and further preferably 75 or less. In addition, a lower limit of the relative permittivity in the part in which the relative permittivity is low, is practically 20 or more.

Thus, a relative permittivity lowering ratio [(relative permittivity before being foamed–relative permittivity after being foamed)×100/relative permittivity before being foamed] by lowering of the bulk density by foaming the resin is preferably 10% or more, more preferably 20% or more, and further preferably 25% or more. Moreover, an upper limit of the relative permittivity lowering ratio is practically 80% or less.

For example, in polyphenylene sulfide (PPS) (trade name: FZ-2100, manufactured by DIC Corporation), if the foaming ratio calculated from the bulk density is 1.5, while the relative permittivity of the polyphenylene sulfide (PPS) per se is 3.3, the relative permittivity is lowered by 27 to 28%, and the relative permittivity after being foamed results in 2.4.

<<Rotating Electrical Machine and Producing Method Therefor>>

The insulated wire of the present invention can be used in various electrical equipment and electronic equipment. In particular, the insulated wire of the present invention is processed into the coil and used in the motor, a transformer, and the like, and can constitute high performance electrical equipment. Above all, the insulated wire is preferably used as a winding wire for a driving motor of HV (hybrid vehicle) or EV (electric vehicle).

Among these, when the insulated wire is used in the rotating electrical machine, such as the motor, as shown in FIG. 2, the insulated wire is cut and turn-processed into the U-shape or the like, and open end portions b2 (11b2) being two ends having U-shape of a plurality of insulated wires having U-shape are alternately connected to form the coils, and the resultant coils are housed in the slots 22 of the stator core. In addition, on the above occasion, connection of the open end portions b2 (11b2) includes: a method 1 in which the connection is made and then the coils are housed in the slots 22; and a method 2 in which no connection is made, and all of the insulated wire divided segments 11 are housed in the slots 22, and then processed by bending to make the connection. In the present invention, application of any of these methods is allowed.

As shown in FIG. 2(a), the coil (insulated wire divided segments) 11 of the insulated wire having U-shape or the like is constituted of: the slot housing portion a (11a) to be housed in the slot 22 of the stator core 20; and the coil end portions b1, b2 (11b1, 11b2) that are not housed in the slot and are protruded from the slot 22, and these slot housing portions having the straight-line portions are set in the slot 22 different from each other, and the coil end portions b1, b2 (11b1, 11b2) are aligned in a state in which the end portions b1, b2 (11b1, 11b2) are protruded from stator planes in parts above and below the stator 100.

Accordingly, the insulated wire to be used is cut somewhat longer, and only the parts to be set in the slot 22 are preliminarily covered with a raw material or a material into which neither the inert gas nor the liquid is penetrated, and only the parts that are planned to be formed into the coil end portions b1, b2 (11b1, 11b2) are bared, and the inert gas or the liquid is penetrated into only these coil end portions b1, b2 (11b1, 11b2), to foam the material. Alternatively, the stator 100 is entirely stored under the inert gas atmosphere in a state in which the coils 11 being the processed insulated wire are set in the slot 22 of the stator 100, and the inert gas or the liquid is penetrated into only the parts protruded from the slot 22 of the stator 100, to foam only the coil end portions b1, b2 (11b1, 11b2).

On the above occasion, in the method 1, foaming is made, and then the open end portions of the insulated wire divided segments 11 are processed by bending, and connected among different insulation divided segments.

In producing the rotating electrical machine of the present invention, the relative permittivity of the insulating material in a specific part of the insulated wire or the coil prepared by processing the wire is lowered, by foaming the coil end portions b1, b2 (11b1, 11b2).

That is, a method of producing the rotating electrical machine of the present invention refers to the method of producing the rotating electrical machine by using the insulated wire in which at least one layer of the insulating material is coated around the conductor, wherein the insulated wire is processed into the coil, and the coil is constituted of: the slot housing portion to be housed in the slot of the stator core in which the coil is set; and the coil end portion that is not housed in the slot of the stator core, and wherein the coil is housed in the slot of the stator core, and the relative permittivity of the insulating material in the coil end portion is lowered: either in the step of fixing the coil; or in the step of assembling the rotating electrical machine thereafter, and the insulating material in the coil end portion is preferably foamed as described above.

EXAMPLES

The present invention will be described in more detail based on examples given below, but the invention is not meant to be limited by these.

Example 1

(Preparation of an Insulated Wire Containing No Bubbles)

An insulated wire was prepared as described below.

A conductor (copper having an oxygen content of 15 ppm) having a circular cross section ($\varphi$0.5 mm) was used, and an extrusion-covering resin layer was formed on the conductor.

As a screw of an extruder, a 30-mm full-flight screw in which L/D=20 and a compression ratio was 3 was used. A 32 µm-thick extrusion-covering resin layer was formed outside the conductor, by using polyethylene terephthalate (PET) (trade name: PET resin TR-8550T, relative permittivity: 3.2, manufactured by Teijin Limited) as a thermoplastic resin, and performing extrusion-covering of PET by using the extrusion die to be analogous to a shape of the conductor in an outer shape of a cross section of the extrusion-covering resin layer, to obtain an insulated wire composed of a PET extrusion-covering layer.

(Preparation of a Foamed Insulated Wire)

In the insulated wire prepared as described above, as shown in FIG. 7, a mask composed of aluminum and having a width of 100 mm and a thickness of 0.05 mm was covered around the insulated wire.

Thus, a partially masked insulated wire was stored in a high-pressure vessel in which a carbon dioxide gas was filled, under conditions of a pressure of 1.7 MPa and a temperature of −30° C. for 42 hours, to penetrate the carbon dioxide gas into the coating resin in the part not covered with the mask.

Then, the insulated wire was removed from the high-pressure vessel, followed by heating under conditions of a temperature of 200° C. for 1 minute, to foam the coating resin in the part not covered with the mask. A thickness of a PET extrusion-covering resin layer after being foamed was 39 µm.

The coating resin in the part not masked, and the coating resin masked were peeled off, respectively, and photographs of cross sections were observed, in the cross sections cut in three kinds of directions, namely a thickness direction, a longitudinal direction and a transverse direction in a sample area, by means of a scanning electron microscope. Cellular bubbles were confirmed in all of the cross sections in a coating layer in the part not masked. Herein, a shape of the bubble was spherical. On the other hand, no cellular bubbles were able to be confirmed in the coating layer in the part masked.

(Measurement of a Bulk Density)

Bulk density was determined in accordance with Method A (water displacement method) in "Plastics-Methods of determining the density and relative density of non-cellular plastics" in JIS K 7112 (1999).

A density measurement kit attached to Electronic Balance SX64 manufactured by Mettler Toledo International Inc. was used, and methanol was used as an immersion fluid. A coating resin part not masked, being a foamed part of the extrusion-covering resin of the insulated wire, and a non-foamed coating resin part masked, were peeled off, respectively, and the resultant sample was taken as each test specimen, and density of the each test specimen was calculated from the following calculation formula.

Density of test specimen $\rho_{S,A} = (m_{S,A} \times \rho_{IL})/(m_{S,A} - m_{S,IL})$ Herein, $m_{S,A}$ is mass (g) of the test specimen measured in the air, $m_{S,IL}$ is mass (g) of the test specimen measured in the immersion fluid, and $\rho_{IL}$ is density (g/cm$^3$) of the immersion fluid.

(Measurement of a Foaming Ratio)

The bulk densities of the coating resin before and after being foamed in the part not masked were measured by the method. A foaming ratio was determined, by dividing the bulk density of the coating resin before being foamed in the part masked by the bulk density of the coating resin after being foamed in the same part.

As a result, the foaming ratio was 1.6.

(Measurement of Relative Permittivity)

Relative permittivity of the resin in the coating layer in the non-foamed part masked and relative permittivity thereof in the foamed part not masked were measured, respectively, as described below. As a result, the relative permittivity of the coating resin in the part masked was 3.3, and the relative permittivity of the coating resin in the part not masked was 2.4.

The relative permittivity was calculated from electrostatic capacity of the insulation layer. That is, the relative permittivity was calculated from a relationship between a length of an electrode and a thickness of the insulation coating, by vapor-depositing a metal electrode on a whole circumference of a coating on an outermost surface of the insulated wire, and measuring the electrostatic capacity between the conductor and the metal electrode. Herein, the electrostatic capacity of the insulation layer was measured, by using LCR HiTester (model 3532-50, manufactured by Hioki E.E. Corporation) at 25° C. and 100 Hz.

Thus, partial discharge inception voltage was evaluated as durability of the thus partially foamed insulated wire.

(Partial Discharge Inception Voltage)

In measuring the partial discharge inception voltage, Partial Discharge Tester "KPD 2050" (trade name), manufactured by Kikusui Electronics Corporation was used. With regard to the partial discharge inception voltage, foamed parts of two insulated wires were intertwisted into a twisted state, an alternating-current voltage having a 50 Hz sine wave was applied between these two conductors, voltage was raised at a voltage rise rate of 50 V/second, and the voltage when a partial discharge of 10 pC was generated was read. In addition, measurement was carried out at a measurement temperature of 25° C.

As a result, the voltage at which the partial discharge of 10 pC was generated was 0.940 kV.

Herein, a part not covered with the mask was confirmed to give the results equivalent to the results in Example 12 described in WO 2011/118717.

Comparative Example 1

An insulated wire before being foamed in Example 1 was taken as Comparative Example 1.

Relative permittivity was measured in the same manner as in Example 1.

As a result, the relative permittivity of the coating resin before being foamed was 3.2.

Moreover, a test specimen in which non-foamed parts of two insulated wires were intertwisted into a twist state was prepared, and voltage (effective value) when a discharge charge amount was 10 pC was measured in the same manner as in Example 1.

As a result, the voltage when the partial discharge of 10 pC was generated was 0.700 kV.

Example 2

(Preparation of an Insulated Wire Containing No Bubbles)

An insulated wire was prepared as described below.

A conductor (copper having an oxygen content of 15 ppm) having a circular cross section (φ1.0 mm) was used, and an extrusion-covering resin layer was formed on the conductor.

As a screw of an extruder, a 30-mm full-flight screw in which L/D=20 and a compression ratio was 3 was used. A 100 μm-thick extrusion-covering resin layer was formed outside the conductor, by using polyethylene naphthalate (PEN) (trade name: Teonex TN8065S, relative permittivity: 3.0, manufactured by Teijin Limited) as a thermoplastic resin, and performing extrusion-covering of PEN by using the extrusion die to be analogous to a shape of the conductor in an outer shape of a cross section of the extrusion-covering resin layer, to obtain an insulated wire composed of a PEN extrusion-covering layer.

(Preparation of a Foamed Insulated Wire)

In the insulated wire prepared as described above, as shown in FIG. 7, a film-shaped mask formed of polyimide and having a width of 100 mm and a thickness of 0.2 mm was covered around the insulated wire, by overlapping the mask by 10 circles of the polyimide mask.

Thus, a partially masked insulated wire was stored in a high-pressure vessel in which a carbon dioxide gas was filled, under conditions of a pressure of 1.7 MPa and a temperature of −25° C. for 168 hours, to penetrate the carbon dioxide gas into the coating resin.

Then, the insulated wire was removed from the high-pressure vessel, followed by heating under conditions of a temperature of 100° C. for 1 minute, to foam the coating resin. A thickness of a PET extrusion-covering resin layer after being foamed in the part not covered with the mask was 142 μm. A thickness of the part covered with the mask was 132 μm.

The coating resin in the part not masked, and the coating resin masked were peeled off, respectively, and photographs of cross sections were observed, in the cross sections cut in three kinds of directions, namely a thickness direction, a longitudinal direction and a transverse direction in a sample area, by means of a scanning electron microscope. Cellular bubbles were confirmed in all of the cross sections each in the coating layer in the part not masked, and in the coating layer in the part masked. Herein, a shape of the bubble was spherical.

(Measurement of a Bulk Density)

The coating resin part not masked of the extrusion-covering resin of the insulated wire, and the coating resin part masked of the insulated wire, were peeled off, respectively, and the resultant sample was taken as each test specimen, and density of the each test specimen was calculated in the same manner as in Example 1.

(Measurement of a Foaming Ratio)

The density of the coating resin part of the insulated wire before being foamed was calculated in the same manner. A foaming ratio was determined, by dividing the bulk density of the coating resin before being foamed by the bulk density of the coating resin after being foamed.

As a result, the foaming ratio in the part not masked was 3.0. Further, the foaming ratio in the part masked was 1.4.

(Measurement of Relative Permittivity)

Relative permittivity of the resin in the coating layer in the part masked and relative permittivity thereof in the part not masked were measured, respectively, in the same manner as in Example 1. As a result, the relative permittivity of the coating resin in the part masked was 2.4, and the relative permittivity of the coating resin in the part not masked was 1.6.

(Partial Discharge Inception Voltage)

Test specimens in which two wires were intertwisted into a twist state in the part masked and the part not masked, respectively, were prepared, and partial discharge inception voltage was measured in the same manner as in Example 1.

As a result, the partial discharge inception voltage in the part not masked was 1.75 kV. Moreover, the partial discharge inception voltage in the part masked was 1.45 kV.

Herein, a part not covered with the mask was confirmed to give the results equivalent to the results in Example 3 described in WO 2011/118717.

Comparative Example 2

An insulated wire before being foamed in Example 2 was taken as Comparative Example 2.

Relative permittivity was measured in the same manner as in Example 2.

As a result, the relative permittivity of the coating resin before being foamed was 3.0.

Moreover, a test specimen in which two insulated wires before being foamed were intertwisted into a twist state was prepared, and partial discharge inception voltage was measured in the same manner as in Example 2.

As a result, the voltage when the partial discharge of 10 pC was generated was 1.10 kV.

Example 3

(Preparation of an Insulated Wire Containing No Bubbles)

An insulated wire was prepared as described below.

A rectangular conductor (copper having an oxygen content of 15 ppm) having a rectangular cross section (long side 3.2 mm×short side 2.4 mm, curvature radius of chamfering of four corners r=0.3 mm) was used, and an enameled baked layer was formed on the conductor.

In forming the enameled baked layer, a 40 μm-thick enameled baked layer was formed, by coating a polyamideimide resin (PAI) varnish (trade name: HI406, manufactured by Hitachi Chemical Co., Ltd.) on the conductor by using a die analogous to a shape of the conductor, and passing the resultant material through a baking furnace set at a furnace temperature of 450° C. and having a furnace length of 8 m at a speed at which a baking time became 15 seconds, and repeating the operations several times, to obtain an enameled wire.

An extrusion-covering resin layer was formed by using the thus-obtained enameled wire as a core wire, as described below.

As a screw of an extruder, a 30-mm full-flight screw in which L/D=20 and a compression ratio was 3 was used. A 41 μm-thick extrusion-covering resin layer was formed outside the enameled baked layer, by using polyphenylene sulfide (PPS) (trade name: FZ-2100, relative permittivity: 3.3, manufactured by DIC Corporation) as a thermoplastic resin, and performing extrusion-covering of PPS by using the extrusion die to be analogous to a shape of the conductor in an outer shape of a cross section of the extrusion-covering resin layer, to obtain an insulated wire composed of a PPS extrusion-covering enameled baked layer.

(Preparation of an Insulated Wire having a Part in which Relative Permittivity is Different in Length Direction in the Coating Layer)

The insulated wire prepared as described above was cut and processed into U shape, in order to set the insulated wire in a slot of a stator to be used in a rotating electrical machine. As shown in FIG. 2, the resultant insulated wire was housed in each slot of the stator, and finally, as shown in FIG. 5, the insulated wires (coil) processed into U-shaped coil winding were fitted into each of the slots.

Two end parts of the inserted U-shaped coil were processed by bending near an outlet from each slot, and these end parts were welded among different coils, and wired as shown in FIG. 6(*b*) when the slot was viewed from a side. Herein, FIG. 6(*a*) shows U-shaped parts of the coils set in the slots.

The stator into which the thus-prepared coils were fitted, was stored in a high-pressure vessel in which a carbon dioxide gas was filled, under conditions of a pressure of 1.2 MPa and a temperature of −32° C. for 24 hours, to penetrate the carbon dioxide gas into the coating resin in the coil end portion.

Then, the stator was removed from the high-pressure vessel, followed by heating under conditions of a temperature of 200° C. for 1 minute, to foam the coating resin in the coil end portion. A thickness of a PPS extrusion-covering resin layer after being foamed was 45 μm.

A resin in the coating layer in the slot housing portion and a resin in the coating layer in the U-shaped part being the coil end portion were peeled off, respectively, and photographs of cross sections were observed, in the cross sections cut in three kinds of directions, namely a thickness direction, a longitudinal direction and a transverse direction in a sample area, by means of a scanning electron microscope, and cellular bubbles were confirmed in all of the cross sections in the coating layer in the U-shaped part being the coil end portion. Herein, a shape of the bubble was spherical.

(Measurement of a Bulk Density)

The U-shaped part being the coil end portion being a foamed part of the extrusion-covering resin of the insulated wire, and a non-foamed slot housing portion thereof were peeled off, respectively, and the resultant sample was taken as each test specimen, and bulk density was determined in the same manner as in Example 1.

(Measurement of a Foaming Ratio)

Bulk densities of the resin in the covering layer in the U-shaped part being the coil end portion before and after being foamed were measured by the method. A foaming ratio was determined, by dividing the bulk density of the coating resin before being foamed in the U-shaped part in the coil end portion by the bulk density of the coating resin after being foamed in the same part.

As a result, the foaming ratio was 1.5.

(Measurement of Relative Permittivity)

Relative permittivity of the resin in the coating layer in the non-foamed slot housing portion and relative permittivity thereof in the U-shaped part being a foamed coil end portion were measured, respectively, in the same manner as in Example 1. As a result, the relative permittivity of the coating resin in the slot housing portion was 3.3, and was the relative permittivity same with the relative permittivity of the resin before being foamed. On the other hand, the relative permittivity of the coating resin in the foamed coil end portion was 2.4.

Comparative Example 3

An insulated wire before being foamed prepared in Example 3 was taken as Comparative Example 3.

In the same manner as in Example 3, relative permittivity of a part measured in Example 3 was measured.

As a result, all of the relative permittivity of the coating resin in the slot housing portion and the relative permittivity of the covering resin in the coil end portion were 3.3.

Also in Example 3, the relative permittivity in the foamed part was lowered in comparison with the relative permittivity in the non-foamed part. Thus, voltage at which a partial discharge of 10 pC was generated, was made higher in comparison with the voltage before being foamed, and the insulated wire is suggested to be excellent in durability.

As is obvious from comparison between Examples 1, 2, and 3, and Comparative Examples 1, 2, and 3 corresponding thereto, the durability was remarkably improved by foaming the resin. Also as is obvious from the producing methods by which the insulated wires were prepared in Examples 1, 2, and 3, the insulated wires and the rotating electrical machine that were excellent in the durability were able to be obtained simply and inexpensively in terms of cost without passing through any complicated process.

Having described our invention as related to the present embodiments, it is our intention that the invention not be limited by any of the details of the description, unless otherwise specified, but rather be construed broadly within its spirit and scope as set out in the accompanying claims.

REFERENCE SIGNS LIST

10 Insulated wire
1 Conductor
2 First coating layer (enameled layer)
3 Second coating layer (extrusion-covering resin layer)
3' Foamed second coating layer (foamed extrusion-covering resin layer)
pf Foamed portion
pnf Non-foamed portion
11 Coil (insulated wire divided segment)
a Slot housing portion (slot straight-line portion)
b1 Turn portion having U shape at the coil end portion
b2 Open end portion at the coil end portion
11α First coil (first insulated wire divided segment)
11β Second coil (second insulated wire divided segment)
100 Stator
20 Stator core
21 Teeth
22 Slot
M Mask

The invention claimed is:

1. A rotating electrical machine comprising an insulated electrical conducting wire in which at least one layer of an insulating material is coated around a conductor,
   wherein
   the insulated electrical conducting wire has a part in which relative permittivity is different in a length direction or a circumferential direction in an identical coating layer,
   the insulated electrical conducting wire is processed by winding into a coil, and the coil comprises: a slot housing portion to be housed in a slot of a stator core in which the coil is set; and a coil end portion that is not housed in the slot of the stator core, and
   relative permittivity of an insulted wire coating in the coil end portion that is not housed in the slot of the stator core, is lower than relative permittivity of an insulated wire coating in the slot housing portion that is housed in the slot of the stator core.

2. A method of producing a rotating electrical machine according to claim 1, wherein the insulated electrical conducting wire is processed by winding into a coil, and the coil comprises: a slot housing portion that is housed in a slot of a stator core in which the coil is set; and a coil end portion that is not housed in the slot of the stator core, and
   wherein relative permittivity of an insulating material in the coil end portion is lowered either in a step of setting the coil in the slot of the stator core to fix the coil or in a step of assembling the rotating electrical machine thereafter.

3. The method of producing the rotating electrical machine according to claim 2, wherein the insulating material in the coil end portion that is not housed in the slot of the stator core is foamed.

4. The method of producing the rotating electrical machine according to claim 3, in which the foaming is performed by the insulating material being penetrated with a gas or liquid, and then foaming the resultant insulating material, wherein the insulating material is covered with a material that is solid and that causes no deformation even at a heating temperature in foaming, and wherein a part not covered therewith has lower relative permittivity in comparison with a part covered therewith.

* * * * *